(12) United States Patent
Handa

(10) Patent No.: US 8,254,254 B2
(45) Date of Patent: Aug. 28, 2012

(54) COMMUNICATION APPARATUS AND METHOD FOR CONTROLLING USE OF SERVICE

(75) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 12/270,693

(22) Filed: Nov. 13, 2008

(65) Prior Publication Data

US 2009/0129340 A1 May 21, 2009

(30) Foreign Application Priority Data

Nov. 15, 2007 (JP) ................................. 2007-296847

(51) Int. Cl.
*G01R 31/08* (2006.01)
(52) U.S. Cl. ........................................ 370/230; 370/236
(58) Field of Classification Search .................. 370/331, 370/230, 236
See application file for complete search history.

(56) References Cited

U.S. PATENT DOCUMENTS

| 5,745,695 A * | 4/1998 | Gilchrist et al. ............... 709/227 |
| 2005/0120087 A1* | 6/2005 | Sekiguchi ....................... 709/206 |
| 2007/0058645 A1* | 3/2007 | Nannra et al. .................. 370/401 |

FOREIGN PATENT DOCUMENTS

JP 2005-33528 2/2005

* cited by examiner

*Primary Examiner* — Sai-Ming Chan
(74) *Attorney, Agent, or Firm* — Canon USA Inc. IP Division

(57) ABSTRACT

A communication apparatus, connected to a first network configured to control use of a service provided in the first network from a second network, sends a first signal to the second network for ending a data request from the second network issued to the service in the first network using a first protocol for connecting the first network with the second network if the type of the service is the data supply service when the service in the first network has ended. Furthermore, the communication apparatus sends a second signal for ending the service in the first network after sending the signal for ending the data request using a second protocol for controlling the service in the first network.

18 Claims, 12 Drawing Sheets

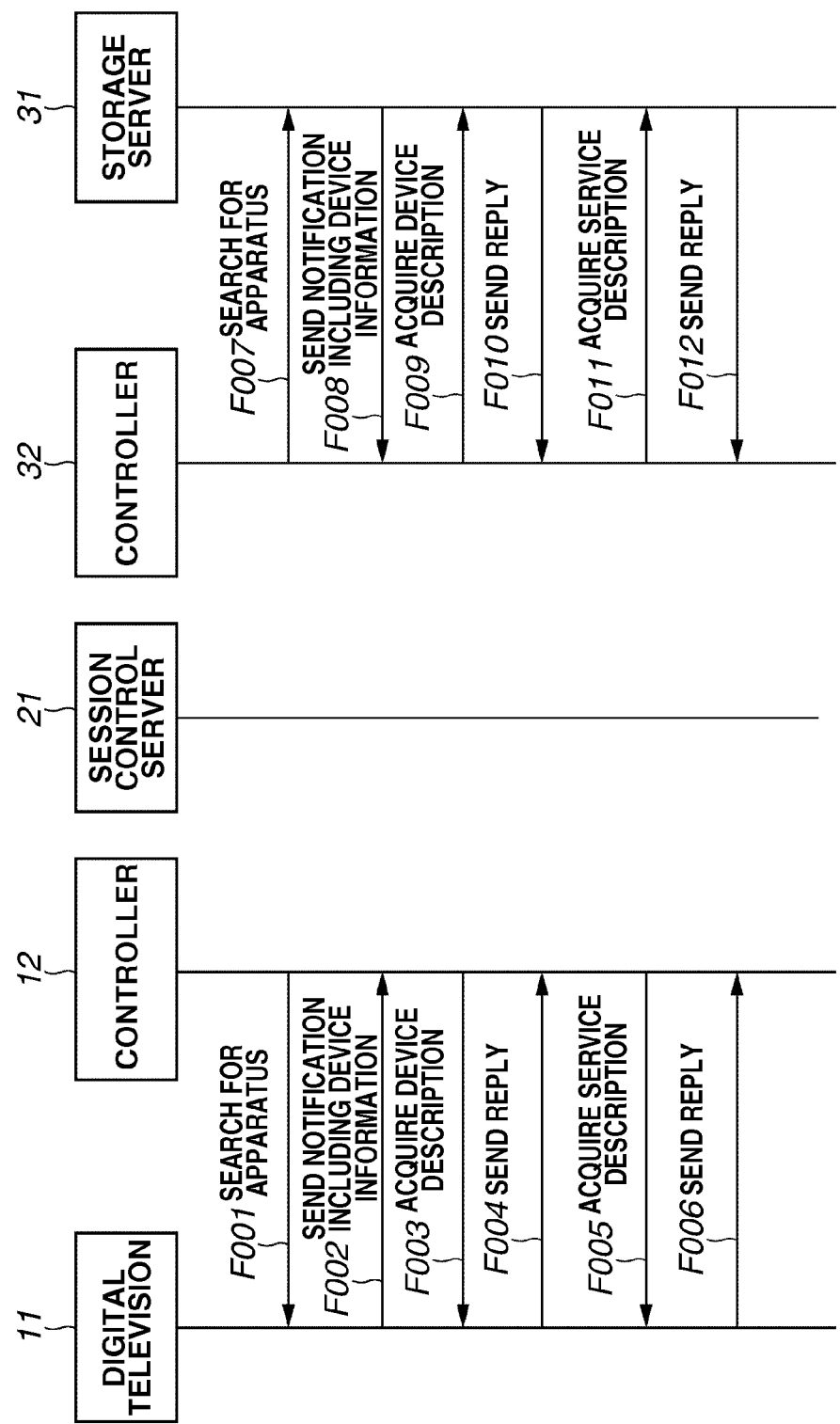

FIG.5

```xml
<?xml version="1.0" encoding="utf-8"?>
<root xmlns="urn:schemas-upnp-org:device-1-0">
   :
   <device>                                           ─501
      <deviceType>urn:schemas-upnp-org:device:MediaRenderer:1</deviceType>
      :
      <serviceList>
         <service>                                    ─502
            <serviceType>urn:shemas-upnp-org:service:LowPowerDevice:1</serviceType>
            <serviceId>urn:upnp-org:serviceId:LowPowerDevice:1</serviceId>
            <SCPDURL>/LowPowerDevice.xml</SCPDURL>
            <controlURL>/control</controlURL>   ─503
            <controlURL>/control</controlURL>
            :                              ─504
         </service>
         :
      </serviceList>
   </device>
</root>
```

FIG.6

```xml
<?xml version="1.0" encoding="utf-8"?>
<scpd xmlns="urn:schemas-upnp-org:service-1-0">
   ⋮
<actionList>
   <action>                  ─601
      <name>Wakeup</name>
   </action>
   <action>                  ─602
      <name>GoToSleep</name>
      <argumentList>
         <argument>          ─603
            <name>PowerState<name>
              ⋮
         </argument>
           ⋮
      </argumentList>
   </action>
</actionList>
<serviceStateTable>
     ⋮
</serviceStateTable>
</scpd>
```

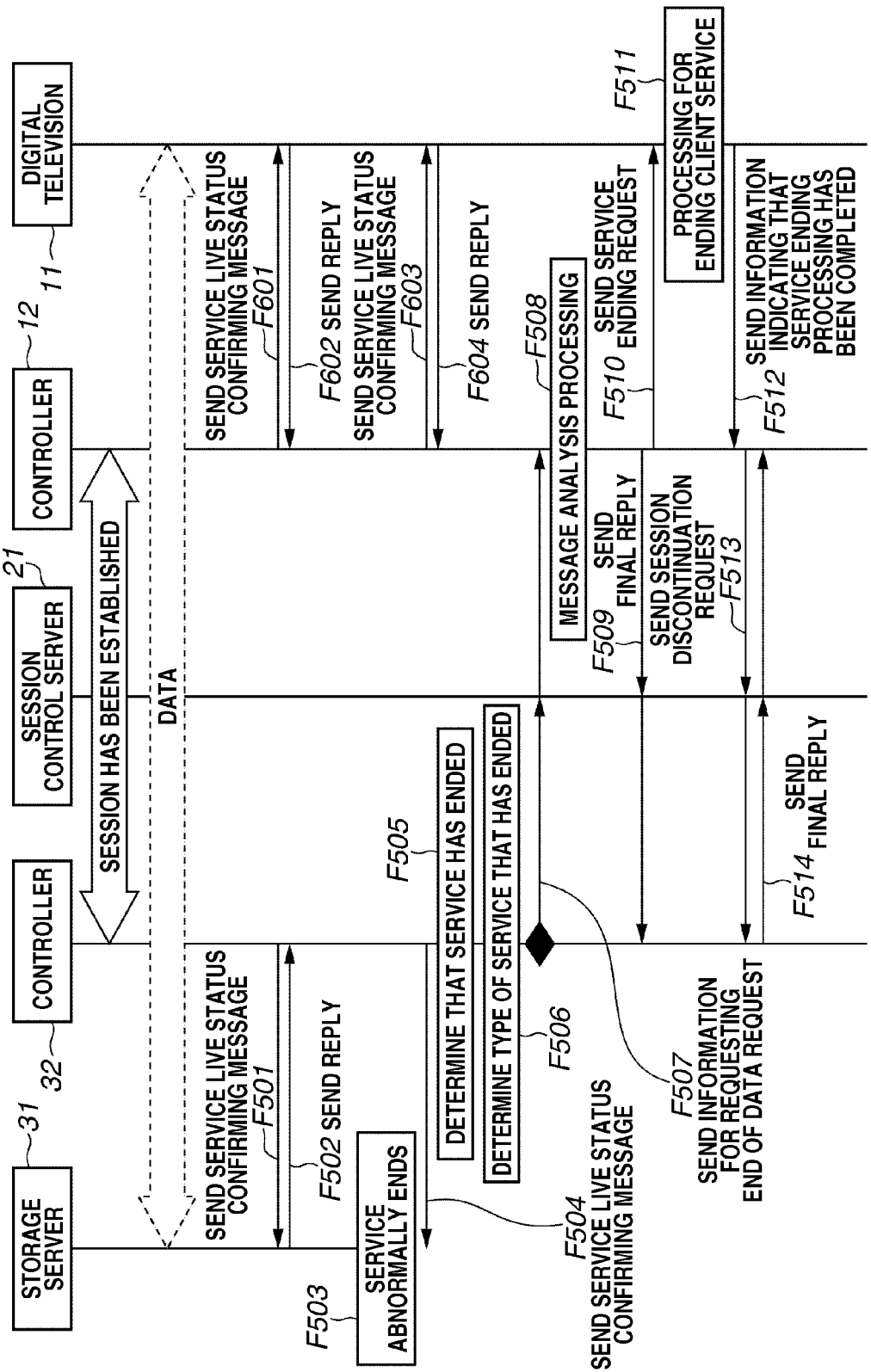

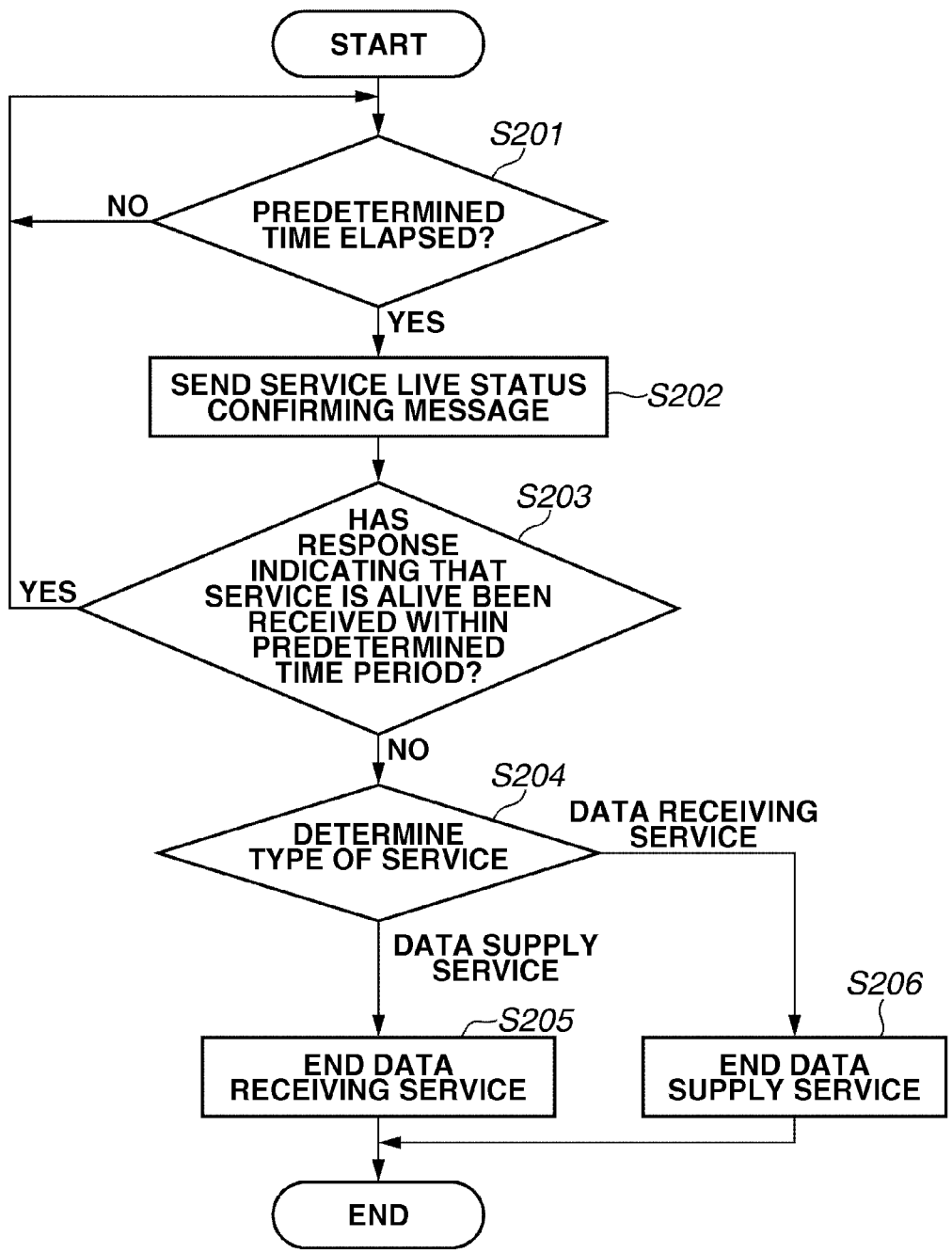

COMMUNICATION APPARATUS AND METHOD FOR CONTROLLING USE OF SERVICE

BACKGROUND OF THE INVENTION

1. Field of the Invention

The present invention relates to a communication apparatus and a method for controlling use of a service.

2. Description of the Related Art

In recent years, a home network system including home electric appliances such as a digital television, a hard disk recorder, and a personal computer (PC) can process multimedia data. In the home network, these appliances are connected, for example, via a wireless local area network (LAN) or a wired local area network (wired LAN). A protocol standardized by Digital Living Network Alliance (DLNA) is used for sending and receiving data over the LAN.

On the other hand, a technology, which establishes a virtual communication path (session) between communication apparatuses to communicate to each other over an Internet protocol (IP) network, has been becoming widely used (see Japanese Patent Application Laid-Open No. 2005-33528).

As a session control protocol for controlling the establishment, the continuation, and the disconnection of a session between communication apparatuses, Session Initiation Protocol (SIP) in the Request for Comments (RFC) 3261 is used. Its specification is published by Internet Engineering Task Force (IETF).

When a service has been performed using apparatuses located on different networks, such a case may occur that a service in one network ends while a service in the other network does not.

A service will be described, for example, which is performed between a digital television having a digital media server (DMS) function and a storage server having a digital media player (DMP) function, both of which are standardized by DLNA, after the session therebetween is established. In addition, the DMP is a client that reproduces content data. The DMS is a server that supplies content data.

In this case, if the data supply by the storage server, located on a different network from the digital television, ends while the digital television is receiving data and reproducing the received data, the digital television on the network may issue a data request for the disconnected service.

Furthermore, in this case, a session may not be disconnected or the data supply by a storage server on another network may not end even when the digital television has ended the service for receiving data and reproducing the received data during the session.

SUMMARY OF THE INVENTION

The present invention is directed to a method for preventing an error from occurring when either one of processing, performed at a service supplier side or using side, ends.

Furthermore, the present invention is directed to a method for preventing the client from issuing a data request for a disconnected data supply service.

In addition, the present invention is directed to a method for preventing the server from supplying data to the client that has ended the data receiving service.

Furthermore, the present invention is directed to a method for ending a service in one network and for disconnecting a session established between the networks when a service in the other network has ended.

According to an aspect of the present invention, a communication apparatus configured to control use of a service provided in a first network from a second network includes a connection unit providing communication to the first network, a first sending unit configured to send a first signal to the second network for ending a data request from the second network to the service in the first network using a first protocol for connecting the first network with the second network if a type of the service is a data supply service when the service in the first network has ended, and a second sending unit configured to send a second signal for ending the service in the first network using a second protocol for controlling the service in the first network after the first sending unit sends a signal for ending the data request.

According to another aspect of the present invention, a method for controlling use, from a second network, of a service provided in a first network with a communication apparatus connected to the first network, the method includes determining a type of the service provided in the first network, sending a first signal from the communication apparatus to the second network for ending a data request from the second network to the service in the first network using a first protocol for connecting the first network with the second network if the type of the service is a data supply service when the service in the first network has ended, and sending a second signal from the communication apparatus for ending the service in the first network using a second protocol for controlling the service in the first network after sending the first signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 4 illustrates an example of processing for acquiring service information according to an exemplary embodiment of the present invention.

FIG. 5 illustrates an example of a response including device information according to an exemplary embodiment of the present invention.

FIG. 6 illustrates an example of a response including information about a command for controlling a service according to an exemplary embodiment of the present invention.

FIG. 11 illustrates an example of processing for ending a service when a service in the home network 3 has abnormally ended according to an exemplary embodiment of the present invention.

FIG. 12 is a flow chart illustrating an example of an operation of the controller performed when a service has abnormally ended according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

First Exemplary Embodiment

Figure 1:
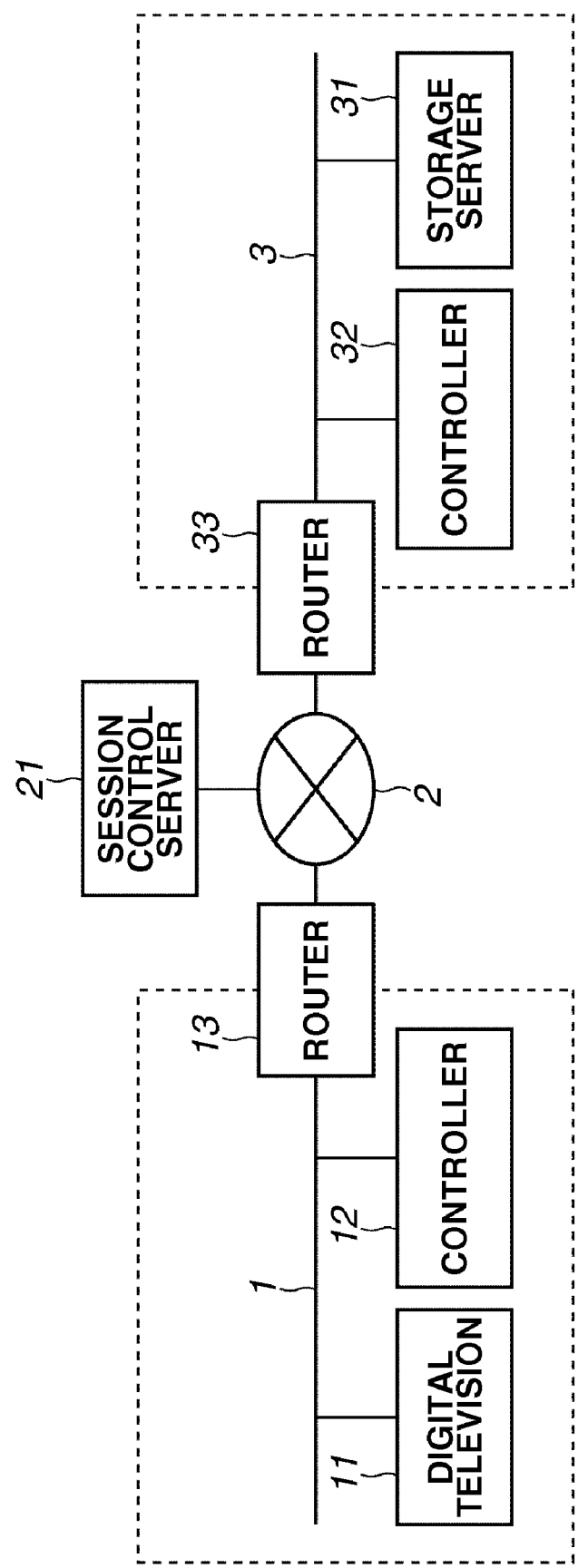
FIG. 1 illustrates an example of a configuration of a network according to an exemplary embodiment of the present invention.

A first exemplary embodiment of the present invention is described below. FIG. 1 illustrates an example of a configuration of a network system according to the present exemplary embodiment.

Referring to FIG. 1, home networks 1 and 3 are connected to the Internet 2 via routers 13 and 33, respectively. For the home networks 1 and 3, either a wireless LAN or a wired LAN can be used.

A case in which home networks are used is described in the present exemplary embodiment. However, in the present exemplary embodiment, office networks or factory networks can replace the home networks.

The network system is connected to the Internet 2. For the Internet 2, any IP networks such as a communication carrier network or Next Generation Network (NGN) can be used.

A digital television 11 is connected to the home network 1. The digital television 11 includes the DMP function standardized by the DLNA, which is a protocol for controlling a service in the network (the home networks 1 and 3) according to the present exemplary embodiment. In the present exemplary embodiment, the DLNA is used as the protocol that an apparatus connected to the home network 1 uses. However, a protocol other than DLNA can be used.

The digital television 11 provides a service in the home network 1. In the present exemplary embodiment, the digital television 11 provides a service for receiving data from a storage server 31.

The storage server 31 is connected to a home network 3. The storage server 31 includes the DMR function standardized by the DLNA. Apparatuses connected to the home network 3 use the same protocol as apparatuses connected to the home network 1 use.

The storage server 31 provides a service in the home network 3. In the present exemplary embodiment, the storage server 31 provides a service for supplying data to the digital television 11.

Controllers 12 and 32 are connected to the home network 1 and the home network 3, respectively. Each of the controllers 12 and 32 includes the Control Point (CP) function standardized by the DLNA. In the DLNA, the CP is defined as a function for operating a device (the digital television or the storage server in the present exemplary embodiment).

Furthermore, each of the controllers 12 and 32 includes a function for performing the connection or disconnection of a session with a remote network. That is, each of the controllers 12 and 32 has a function for performing the connection or disconnection of a session established between them (between the home networks 1 and 3) using the SIP, which is a protocol for connecting the home network 1 with the home network 3 according to the present exemplary embodiment.

The controllers 12 and 32 communicate with other apparatuses connected to the home networks 1 and 3 according to the DLNA. Furthermore, the controllers 12 and 32 communicate with each other according to the SIP.

The controller 12 is a communication apparatus that controls the use of the service in the home network 1 from the home network 3. The controller 32 is a communication apparatus that controls the use of the service provided in the home network 3 from the home network 1.

Each of routers 13 and 33 is located between the Internet 2 and the home networks 1 or 3. Each of the routers 13 and 33 includes a communication transmission function such as a network address translation (NAT)-traversal or a firewall. The routers 13 and 33 can perform all or some of the functions of the controllers 12 and 32.

A session control server 21 is provided on the Internet 2. The session control server 21 provides various types of session control services such as an address resolution using the SIP or a message transfer service.

Figure 2:
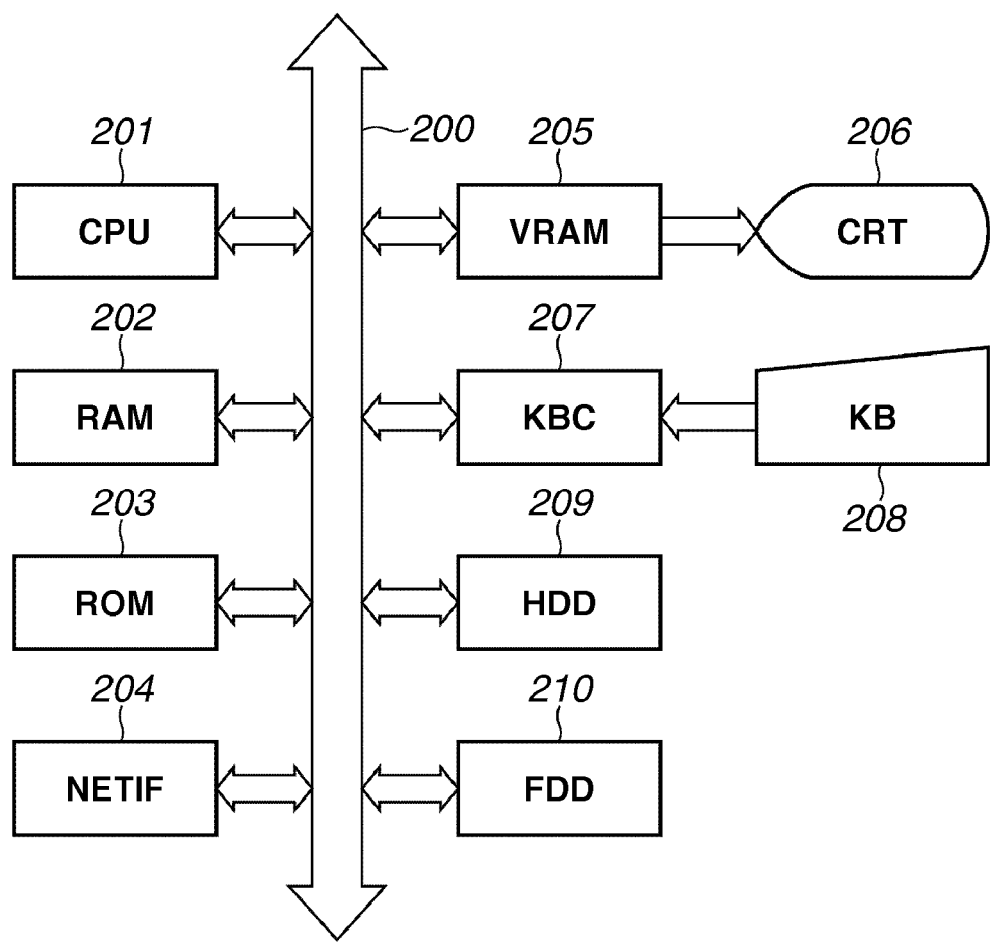
FIG. 2 illustrates an example of a hardware configuration of a controller according to an exemplary embodiment of the present invention.

An example of a hardware configuration of the controllers 12 and 32 according to the present exemplary embodiment will be described below with reference to FIG. 2. The controller 12 is a communication apparatus that controls the use of the service in the home network 1 from the home network 3. The controller 32 is a communication apparatus that controls the use of the service in the home network 3 from the home network 1.

Each of the controllers 12 and 32 is not limited to a computer system such as a PC. More specifically, the controllers 12 and 32 can be constituted by a workstation, a laptop PC, a palmtop PC, various types of household electrical appliances with a built-in computer, a game machine having a communication function, a cellular phone, a personal digital assistant (PDA), or a remote controller, instead of a computer system. Furthermore, the controllers 12 and 32 can be integrally constituted by an apparatus that provides a data receiving service and a data supply service.

A central processing unit (CPU) 201 controls the entire computer system. A random access memory (RAM) 202 includes areas for temporarily storing programs and data that is input to the communication apparatus. Furthermore, the RAM 202 includes a work area used by the CPU 201 to perform various types of processing.

A read-only memory (ROM) 203 stores a program for controlling the entire communication apparatus. The CPU 201 can read out the program from the ROM 203.

A network interface (hereinafter referred to as a "NETIF") 204 performs control for transmitting data between the computer systems (PCs) and a diagnosis of the connection status via the network (e.g., the home network 1). The NETIF 204 in the controller 12 sends and receives signals to and from the digital television 11 in the home network 1.

That is, the controller 12 is connected to the home network 1 and sends and receives signals for acquiring a service information, for starting a service, and for requiring a service ending, according to the DLNA via the NETIF 204.

The DLNA is a protocol for controlling a service in the network (the home networks 1 and 3 in the present exemplary embodiment). The controller 12 receives a data request sent from the digital television 11 and transfers the received data request to the controller 32 via the NETIF 204.

Furthermore, the NETIF 204 in the controller 12 sends and receives signals to and from the controller 32 via a router 13, the Internet 2, and a router 33. More specifically, the controller 12 sends and receives signals, for example, for a notification of the SIP information, a connection request, a disconnection request, and for sending a final reply, to and from the controller 32 according to the SIP via the NETIF 204. The SIP is a protocol used for connecting the home network 1 with the home network 3.

The NETIF 204 of the controller 32 sends and receives a signal to and from the storage server 31 on the home network 3. That is, the controller 32 is connected to the home network 3 and sends and receives signals to and from the storage server 31 for acquiring a service information, starting a service, and requesting a service ending via the NETIF 204 according to the DLNA.

The DLNA is a protocol for controlling the service in the network (the home network). Furthermore, the controller 32 receives the data request sent from the home network 1 and transfers the received data request to the storage server 31 via the NETIF 204.

Furthermore, the NETIF 204 in the controller 32 sends and receives signals to and from the controller 12 via the router 33, the Internet 2, and the router 13.

More specifically, the controller 32 sends and receives signals for acquiring service information, starting a service, and requesting a service ending to and from the controller 12 according to the SIP via the NETIF 204.

A video RAM 205 rasterizes an image to be displayed on a screen of a display device (CRT) 206, which will be described in detail below, and controls the display of the rasterized image. The CRT 206 can be a display, for example.

A control unit 207 controls an input signal from an external input device 208, which will be described in detail below. The external input device 208, for example, a keyboard, receives an instruction operated by a user to be executed on the controller.

A storage device (HDD) 209 such as a hard disk is used to store application programs and data such as image information. Application programs according to the present exemplary embodiment are software programs for determining a service type and sending signals for requesting to end the service, for example.

An external input/output (I/O) device (FDD) 210 inputs and outputs data to and from a removable storage medium such as a flexible disk or a compact disk-read only memory (CD-ROM). The FDD 210 is used to read the above-described application programs from a storage medium. Note that an application programs and data stored on the HDD 209 can be stored on the FDD 210 and executed.

An input/output bus (an address bus, a data bus, or a control bus) 200 connects the above-described units.

Figure 3:
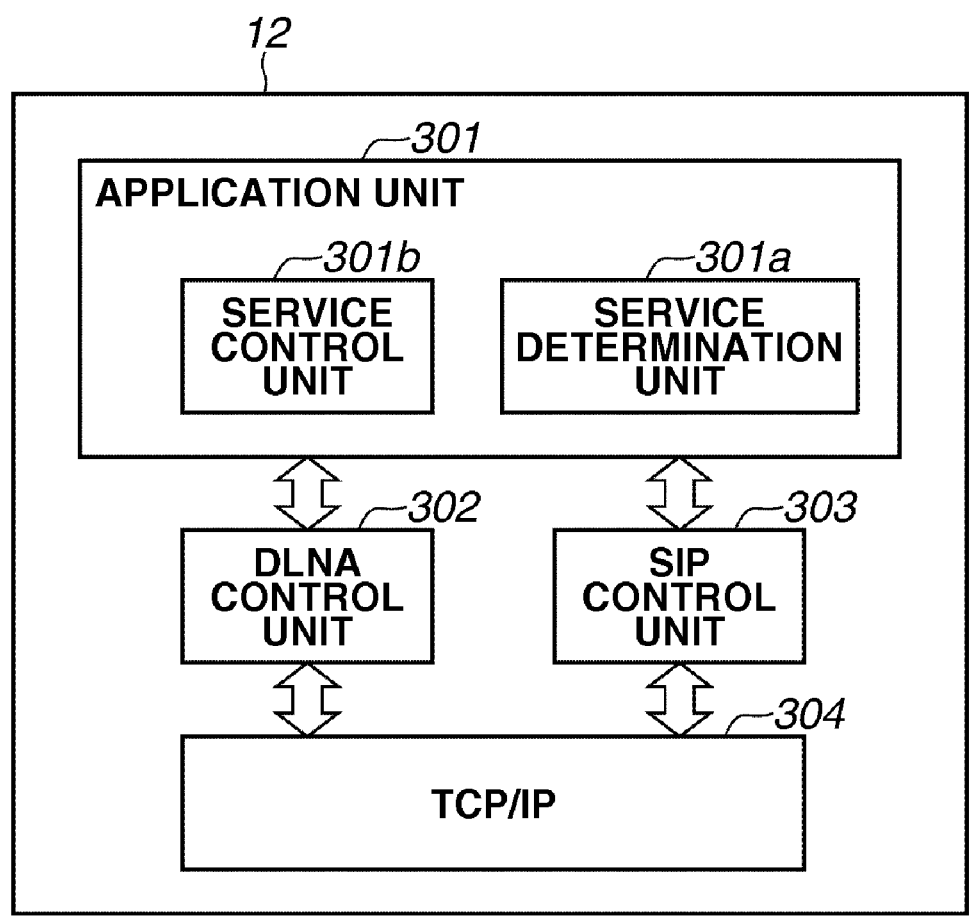
FIG. 3 illustrates an example of a software configuration of a controller according to an exemplary embodiment of the present invention.

Next, an exemplary software configuration of the controllers 12 and 32 according to the present exemplary embodiment is described. FIG. 3 illustrates an example of a software configuration according to the present exemplary embodiment. The software is stored on the HDD 209, for example, and read out from the HDD 209 on the RAM 202 and executed with the CPU 201 when needed.

An application unit 301 includes a service determination unit 301a and a service control unit 301b. The application unit 301 controls a service.

The service determination unit 301a determines whether the type of a service provided by the apparatuses (the storage server 31 and the digital television 11) is a data receiving service or a data providing service by performing processing to be described in detail below. That is, the service determination unit 301a determines the type of the service in the network (the home network). Furthermore, the service determination unit 301a confirms a live status of an apparatus by sending and receiving certain signals to and from a service providing apparatus.

The service control unit 301b issues an instruction for ending the service based on the result of the determination by the service determination unit 301a. The processing for ending a service will be described in detail below.

A DLNA control unit 302 sends and receives a message to and from the service providing apparatus according to various DLNA protocols for acquiring a command to control the service and instructing the ending of the service.

More specifically, the DLNA control unit 302 sends a signal to the service in the network using the protocol (DLNA protocol) for controlling the service in the network (the home network).

An SIP control unit 303 sends and receives a message to establish a session between the controller 12 and the controller 32, to disconnect the session, or to send an information notification under the SIP regulations. That is, the SIP control unit 303 sends a signal under the protocol (SIP) for connecting one network (the home network 1) with another network (the home network 3).

A Transmission Control Protocol/Internet Protocol (TCP/IP) unit 304 uses a TCP/IP protocol, which is commonly used in communication networks, to establish a connection to the network and to transmit a message from/to the networks to/from the DLNA control unit 302 or the SIP control unit 303.

The application unit 301 in the controller 12 communicates with the digital television 11 via the DLNA control unit 302 and the TCP/IP unit 304.

Furthermore, the application unit 301 of the controller 12 performs a communication with the controller 32 via the SIP control unit 303 and the TCP/IP unit 304.

The application unit 301 in the controller 32 communicates with the storage server 31 via the DLNA control unit 302 and the TCP/IP unit 304.

Furthermore, the application unit 301 in the controller 32 communicates with the controller 12 via the SIP control unit 303 and the TCP/IP unit 304.

Next, a method for detecting a service connected to each network (the home network) and acquiring a service control command, which is performed by the controllers 12 and 32, will be described below with reference to FIG. 4.

The detection of a service connected to the network and the acquisition of a service control command are performed before a service starts.

In the present exemplary embodiment, the processing for detecting a data receiving service and the processing for acquiring a command for controlling the service performed only by the digital television 11 is described, as the controller 32 performs command acquisition processing in a similar way (step F007~step F012).

Referring to FIG. 4, in step F001, the DLNA control unit 302 in the controller 12 multicasts an M-search message in a service discovery protocol to search for a service connected to the network (the home network 1).

Simple Service Discovery Protocol (SSDP) is used as the "service discovery protocol". The "M-search message" is a message for searching for a service in the SSDP. In the DLNA, Universal Plug and Play (UPnP) is used to recognize each device. In the UPnP, the SSDP is used.

In step F002, after receiving the M-search message, the digital television 11 sends a NOTIFY message including a uniform resource locator (URL), with which the access to device information of the digital television 11 is possible, to the DLNA control unit 302 in the controller 12.

In step F003, after receiving the NOTIFY message, the DLNA control unit 302 in the controller 12 sends a GET command in the hypertext transport protocol (HTTP) to the URL included in the NOTIFY message to acquire the device information of the digital television 11. The URL describes an address of a file storing the device information of the digital television 11.

After receiving the GET command, the digital television 11 reads its device information based on the URL included in the received NOTIFY message. The device information includes the device type "deviceType" and a service list "serviceList".

Furthermore, the service list describes the service type "serviceType", the service description URL "SCPDURL", and the control URL "controlURL" for each service.

In step F004, the digital television 11 sends a 200 OK response in HTTP including the read out device information to the DLNA control unit 302 in the controller 12.

FIG. 5 illustrates partially an example of a 200 OK response sent as a reply in step F004. Referring to FIG. 5, a portion indicated by 501 shows the device type of the digital television 11.

A portion indicated by 502 shows the service type that the digital television 11 can support. A portion indicated by 503 shows a service description URL describing an acquisition source of the service control command that the digital television 11 can support.

A portion indicated by 504 shows a sending destination URL of a Simple Object Access Protocol (SOAP) request.

Information "MediaRenderer" in the device type 501 in FIG. 5 indicates that the service provided by the device is a data receiving service. Furthermore, the type of the service can be determined based on the information included in the service type 502.

In step F004, the DLNA control unit 302 in the controller 12 receives the 200 OK response sent from the digital television 11. Then, the DLNA control unit 302 in the controller 12 acquires the URL of an acquisition source of the service control command.

In step F005 (FIG. 4), the DLNA control unit 302 in the controller 12 sends a GET command in HTTP to each URL described in the service list to acquire detailed service information and detailed service control command information. The sending destination of the GET command includes the service description URL 503.

After receiving the GET command, the digital television 11 sends the 200 OK response including information designated by the controller 12 to the controller 12 using the URL for the GET command sending destination.

In step F006, the DLNA control unit 302 in the controller 12 receives the 200 OK response sent from the digital television 11.

FIG. 6 illustrates partially an example of the 200 OK response (step F006) that the digital television 11 sends in response to the GET command (step F005) that has been sent to the service description URL 503. Referring to FIG. 6, each of portions indicated by 601 and 602 shows a service control command name. Furthermore, a portion indicated by 603 shows an argument name and a return value name used for sending a command.

By performing the above-described processing, the DLNA control unit 302 in the controller 12 acquires information about the service control command from the acquisition source of the acquired command (the service description URL 503). The command for ending the service is included in the service control command.

Then, the service control unit 301b in the controller 12 ends the service provided by the digital television 11 in response to the command, acquired during the above-described processing, for ending the service.

In the case of a data receiving service, the command for ending the service includes a command for ending the data request, a command for powering off the service providing apparatus, and a command for making the service providing apparatus to a standby state.

Furthermore, in the case of a data supply service, the command for ending the service includes a command for disconnecting the supply of data, a command for powering off the service providing apparatus, and a command for causing the service providing apparatus to enter a standby state. In addition, the service control commands include commands unique to the service providing apparatus other than DLNA commands.

Then, the service control unit 301b generates a SOAP message to be used for sending a command to the service providing apparatus by using the information in the acquired command.

Next, the service ending processing according to the present exemplary embodiment will be described. In the present exemplary embodiment, the storage server 31 provides data supplying service while the digital television 11 provides the data receiving service. A SIP session control protocol is used therein.

Figure 7:
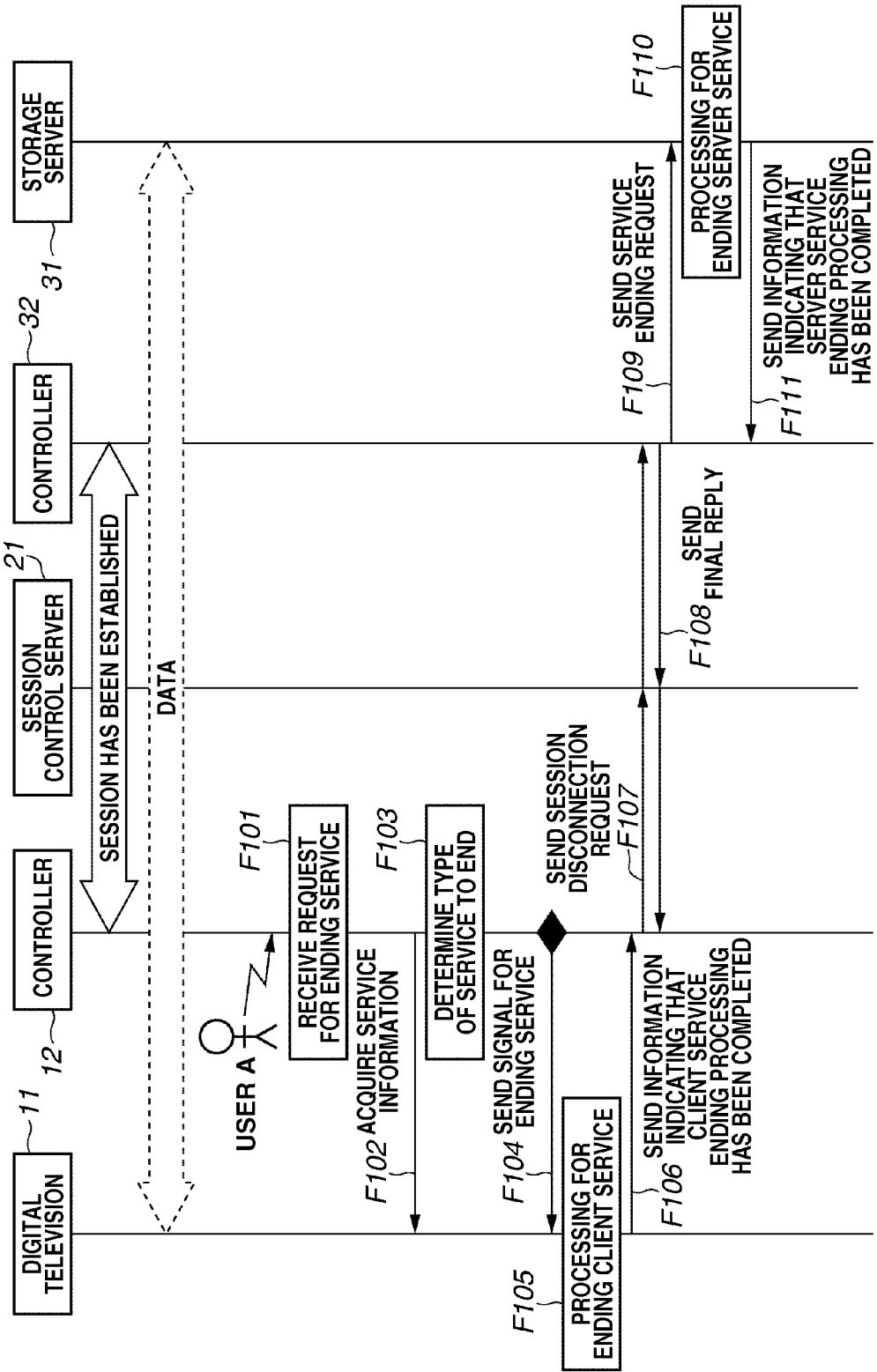
FIG. 7 illustrates an example of processing for ending a service when a service ending request is input from a home network 1 according to an exemplary embodiment of the present invention.

With reference to FIG. 7, the service ending processing, performed when the service ending request is input to the home network 1 (a first network) to which the digital television 11 that provides the data receiving service is connected, is described below.

The digital television 11 receives data supplied from the storage server 31 connected to the home network 3 (a second network) which is established a session with the home network 1.

More specifically, controllers 12 and 32 have already established a session between the home networks 1 and 3 by the instruction from a user and have performed processing necessary for sending and receiving data between the digital television 11 and the storage server 31.

Accordingly, each of the controllers 12 and 32 recognizes that the data sending and receiving service has already been performed between the digital television 11 connected to the home network 1 and the storage server 31 connected to the home network 3.

In the present exemplary embodiment, the DLNA is used as the protocol for controlling the service in the network (the home network). The SIP is used as the protocol for connecting the home network 1 (the first network) with the home network 3 (the second network).

In step F101, the DLNA control unit 302 in the controller 12 connected to the home network 1 detects that a service ending request for performing service ending processing of the digital television 11 is input in response to detection of the service ending request caused by a service ending operation by a user A as a trigger thereto.

For detection of the service ending request, the controller 12 can detect a user A's operation operated via the operation unit of the controller 12 or can receive a signal indicating a service ending request via a remote controller (not illustrated).

Also, the service ending request can be detected in response to the service ending operation input to the service providing apparatus (the digital television 11).

After detecting the service ending request, the DLNA control unit 302 in the controller 12 has acquired service information of the digital television 11 by this time by performing the processing described above with reference to FIG. 4. However, a part of or the entire service information acquisition processing can be performed after the service ending request is detected (step F102).

In step F103, the service determination unit 301a in the controller 12 determines that the service provided by the digital television 11 is the data receiving service based on the service information.

That is, in step F103, the service determination unit 301a of the controller 12 determines the type of the service in the network (the home network 1). In step F103, the type of the service in the network (the home network 1), whose service ending request has been detected in F101, is determined.

In step F104, the service control unit 301b in the controller 12 sends a signal for ending the data request to the digital television 11. More specifically, if it is determined in step F103 that the service in the network 1 is the data receiving service, then the service control unit 301b in the controller 12 sends, to the service in the home network 1, a signal for ending the data request to the service in the home network 3.

In this processing, the service control unit 301b sends the data request ending signal using the protocol for controlling the service in the first network (the home network 1).

In step F105, after receiving the signal for ending the data request, the digital television 11 performs processing for ending the data request issued to the storage server 31. In step F106, after completely performing the data request ending processing, the digital television 11 sends a completion notification to the controller 12 indicating that the data request ending processing has been completely performed.

In step F107, after receiving the completion notification with the NETIF 204, the controller 12 sends a signal for requesting to end the service provided by the storage server 31 with the SIP control unit 303 to the controller 32 in the home network 3.

More specifically, in step F107, the SIP control unit 303 sends a signal for ending the service in the home network 3 (the storage server 31) according to the protocol (SIP) for connecting the home network 1 with the home network 3.

Furthermore, in the present exemplary embodiment, the SIP control unit 303 sends a BYE request according to the SIP (disconnection request), which is a signal for requesting the disconnection of the logical connection between the home network 1 and the home network 3, as a service ending request signal.

More specifically, after the DLNA control unit 302 has sent the data request ending signal (step F104), the SIP control unit 303 in the controller 12 sends a signal for requesting to end the service provided by the home network 3 to the home network 3.

By using a signal for requesting the disconnection of the logical connection between the networks as the signal for ending the service by the home network 3, it is possible to end the service in the remote network and issue a request for disconnecting the session between one network (the home network 1) and the other remote network (the home network 3). The service ending request and the session disconnection request can be sent using different signals.

The controller 12 performs connection processing for establishing a session with the controller 32 of the home network 3 before sending and receiving a service between the digital television 11 and the storage server 31.

As described above, by this time, the controller 12 has recognized that a data supply service, corresponding to the service required from the digital television 11 whose ending request has been detected in step F101, exists in the home network 3. Meanwhile, by this time, the controller 32 in the home network 3 has recognized that the storage server 31 is providing the service for sending data to the home network 1.

After receiving the BYE request (disconnection request) from the controller 12, in step F108, the SIP control unit 303 in the controller 32 sends a 200 OK response (a final reply) in response to the BYE request to the controller 12.

In step F109, the service control unit 301b in the controller 32 sends a signal for requesting to end the service by the storage server 31. The storage server 31 provides the service in the home network 3 corresponding to the service whose ending has been requested in step F101.

After receiving the signal for requesting to end the service, the storage server 31 performs the service ending processing in step F110.

When the service ending processing is completed, in step F111, the storage server 31 sends the DLNA control unit 302 in the controller 32 a completion notification indicating that the service ending processing has been completed.

As described above, the controller 12 determines the type of the service to end located in the network where service ending request is input (the home network 1).

Then, if it is determined that the service is the data receiving service (by the digital television 11), then the controller 12 sends the signal for ending the data request issued by the data receiving service to the service in the home network 1.

The signal for ending the data request sent at this time is based on the protocol (DLNA) for controlling the service in the home network 1.

Then, after sending the signal for ending the data request, the controller 12 sends a signal for ending the data supply service to the home network 3 according to the protocol (SIP) for connecting the home network 1 with the home network 3.

By performing the above-described processing, the present exemplary embodiment can prevent a data request from being issued to a disconnected data supply service.

Next, the service ending processing is described with reference to FIG. 8 that is performed when the network where service ending request is input (the first network) is the home network 3 to which the storage server 31, which is a data supply service providing apparatus, is connected.

The storage server 31 supplies data to the digital television 11 connected to the home network 1 (the second network) of which a session with the network where service ending request is input (the home network 3) has been established.

More specifically, each of the controllers 12 and 32 has already established a session between the home networks 1 and 3 according to the instruction from the user and has performed processing necessary for sending and receiving data between the digital television 11 and the storage server 31.

Accordingly, each of the controllers 12 and 32 recognizes that the data sending and receiving service has already been performed between the digital television 11 connected to the home network 1 and the storage server 31 connected to the home network 3.

In the present exemplary embodiment, the DLNA is used as the protocol for controlling the service in the network (the home network). The SIP is used as the protocol for connecting the home network 3 (the first network) with the home network 1 (the second network).

Figure 8:
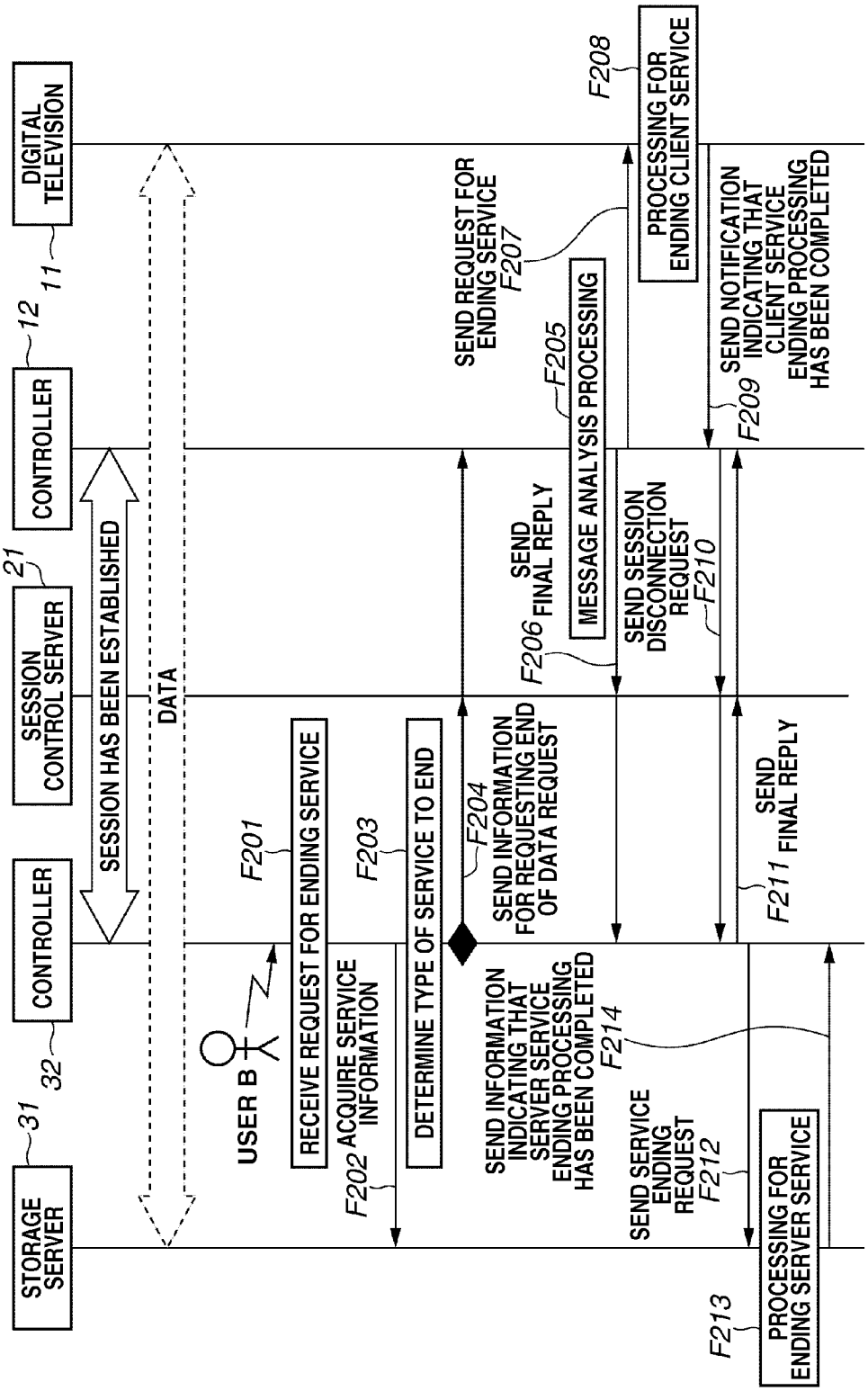
FIG. 8 illustrates an example of processing for ending a service when a service ending request is input from a home network 3 according to an exemplary embodiment of the present invention.

Referring to FIG. 8, in step F201, the DLNA control unit 302 in the controller 32 connected to the home network 3 detects that a service ending request for performing service ending processing by the storage server 31 has been input in response to receiving the service ending request according to a service ending operation by a user B as a trigger thereto.

For detecting the service ending request, the controller 12 can detect a user B's operation performed via the operation unit of the controller 12 or can receive a signal indicating a service ending request via a remote controller (not illustrated). For detecting the service ending request, the controller 12 also can detect the service ending operation input on the service providing apparatus (the storage server 31).

After detecting the service ending request, the DLNA control unit 302 in the controller 32 has acquired information about the service provided by the storage server 31 by this time by performing the processing described above with reference to FIG. 4. However, a part of or the entire service information acquisition processing can be performed after the service ending request is detected (step F202).

In step F203, the service determination unit 301a in the controller 32 determines based on the service information that the service provided by the storage server 31 is the data supply service.

That is, in step F203, the service determination unit 301a in the controller 32 determines the type of the service in the network (the home network 3). In step F203, the type of the service, in the network (the home network 3) whose service ending request has been detected in F201, is determined.

In step F204, the SIP control unit 303 in the controller 32 adds information for requesting to end the data request issued by the digital television 11 to a BODY portion of an INFO request in the SIP (information notification) and sends it to the controller 12.

That is, if it is determined in step F203 that the service in the home network 3 is the data supply service, then the SIP control unit 303 sends to the home network 1 a signal for ending the data request for a service provided on the home network 3.

Furthermore, in step F204, the SIP control unit 303 sends a signal for ending the data request for the storage server 31 according to the protocol (SIP) for connecting the home network 1 with the home network 3.

The controller 32 performs connection processing for establishing a session with the controller 12 on the home network 1 before sending and receiving of the service between the digital television 11 and the storage server 31.

As described above, by this time, the controller 32 has recognized that a data receiving service corresponding to the service, provided by the storage server 31 to which ending request has been detected in step F201, exists in the home network 1. Meanwhile, by this time, the controller 12 on the home network 1 has recognized that the digital television 11 performs the service for receiving data from the home network 3.

After receiving the INFO request, the SIP control unit 303 in the controller 12 analyzes the BODY portion of the INFO request in step F205.

In step F206, the SIP control unit 303 in the controller 12 sends a SIP 200 OK response (the final reply) to the controller 32 in response to the INFO request.

In step F207, the service control unit 301b in the controller 12 sends a signal for ending the data request to the digital television 11. The digital television 11 is the service, corresponding to the service whose ending has been requested in step F201, in the home network 1.

In step F208, after receiving the signal for ending the data request, the digital television 11 performs the data request ending processing to end the data request to the storage server 31.

After completely performing the data request ending processing, in step F209, the digital television 11 sends the controller 12 a completion notification indicating that the data request ending processing has been completed.

After receiving the completion notification with the NETIF 204, in step F210, the controller 12 sends the SIP BYE request (disconnection request) to the controller 32, which is a signal for requesting the disconnection of the logical connection between the home network 1 and the home network 3.

After receiving the BYE request (disconnection request), the SIP control unit 303 in the controller 32 sends the controller 12 a 200 OK response (the final reply) in response to the BYE request in step F211.

In step F212, the service control unit 301b in the controller 32 sends a signal for requesting to end the service to the storage server 31.

More specifically, if it is determined in step F201 that the service has ended, then, after sending a signal for ending the data request, in step 204, the service control unit 301b in the controller 32 sends a signal for requesting to end the service in the home network 3.

In step F212, the service control unit 301b sends the storage server 31 a signal for requesting to end the service according to the protocol (DLNA) for controlling the service in the network (the first network).

Furthermore, after receiving the request for disconnecting the logical connection between the home network 1 and the home network 3 (disconnection request), the service control unit 301b in the controller 32 according to the present exemplary embodiment sends a signal for requesting to end the service in the home network 3.

By performing the above-described processing, it has become possible that the controller 32 ends the data supply service after confirming that the data request ending processing in the data receiving service has been completed. However, it is also possible that the controller 32 sends a signal for ending the data supply service after a predetermined time period even if the disconnection request has not been received yet.

After receiving a signal for requesting to end the service, the storage server 31 performs the service ending processing in step F213.

When the service ending processing is completed, in step F214, the storage server 31 sends a completion notification which indicates that the service ending processing has been completed, to the DLNA control unit 302 in the controller 32.

As described above, the controller 32 determines the type of the service in the home network 3 to end. If it is determined that the type of the service in the home network 3 to end is the data supply service (by the storage server 31), then the controller 32 sends the signal for ending the data request by the data receiving service (the digital television 11) to the home network 1.

The signal for ending the data request sent at the time is based on the protocol (SIP) for connecting the home network 1 and the home network 3.

After sending the signal for ending the data request, the controller 32 sends a signal for ending the data supply service to the service (the storage server 31) in the home network 3 according to the protocol (DLNA) for controlling the service in the home network 3.

By performing the above-described processing, the present exemplary embodiment can prevent a data request from being issued to a data supply service that is not operating.

Next, service ending processing performed by the controller connected to the network where service ending request is detected (the first network) will be described with reference to FIG. 9.

Each of the service providing apparatuses is providing a respective service until a service ending request is detected. The apparatuses are connected to the first network or the second network, and the session between the first network and the second network is established.

More specifically, the controller has already established a session between the first and the second networks according to the instruction from the user and has performed processing necessary for sending and receiving data to and from the digital television 11 and the storage server 31.

Accordingly, the controller recognizes the relationship between the service providing apparatuses connected to the first network and the second network. The relation is, for example, that an apparatus connected to the first network sends/receives data to/from another apparatus connected to the second network.

In the present exemplary embodiment, the DLNA is used as the protocol for controlling the service in the network (the home network). The SIP is used as the protocol for connecting the first network and the second network.

Figure 9:
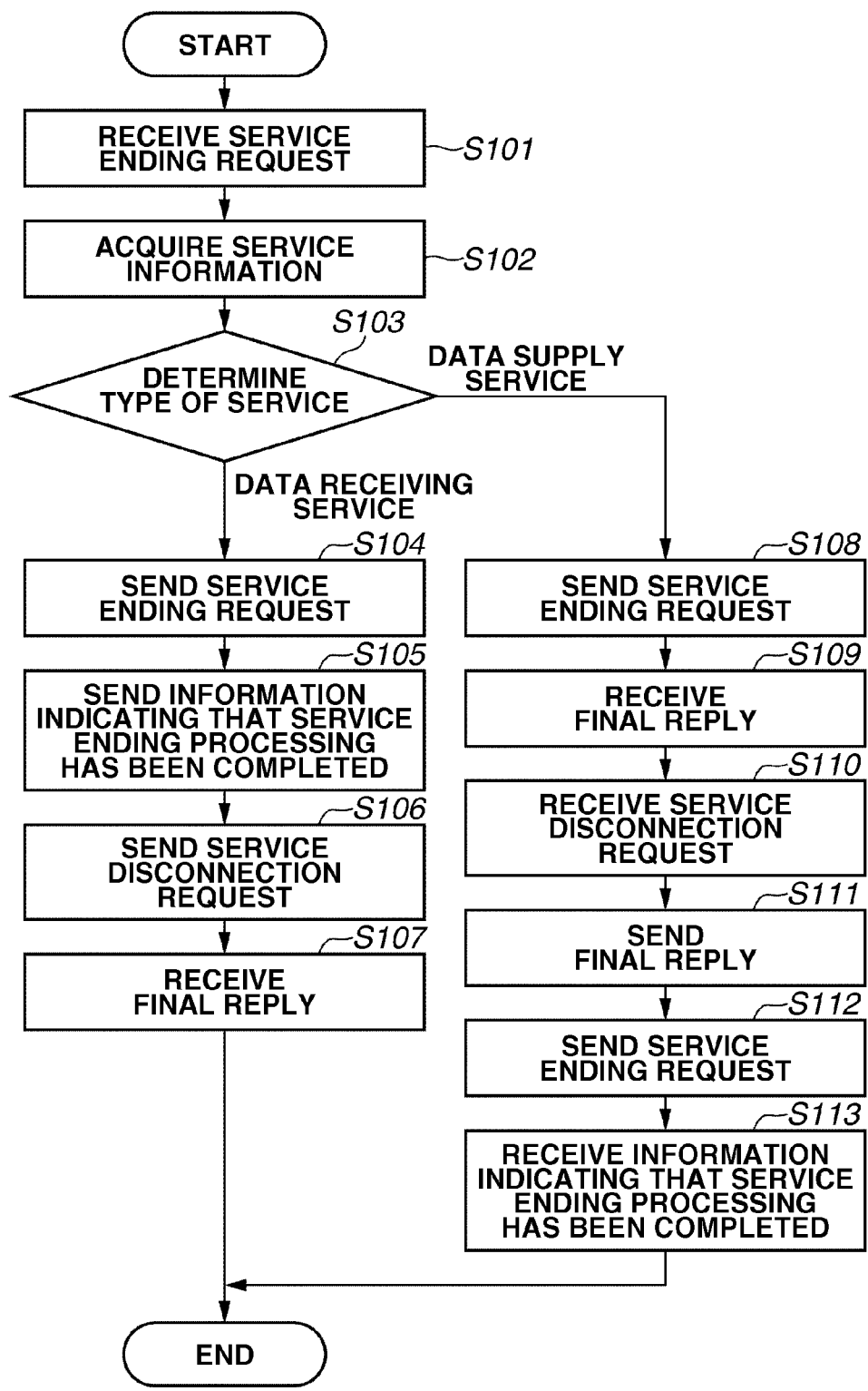
FIG. 9 is a flow chart illustrating an example of an operation of the controller that detects a service ending request according to an exemplary embodiment of the present invention.

Referring to FIG. 9, in step S101, the DLNA control unit 302 in the controller 12 detects a service ending request by a user's service ending operation as a trigger thereto.

For detecting the service ending request, the controller 12 can use a user's operation performed with the operation unit of the controller 12 or can use a signal indicating a service ending request by a remote controller (not illustrated).

Furthermore, for detecting the service ending request, the controller 12 can use the service ending operation which is input to the service providing apparatus (the digital television 11 or the storage server 31).

After detecting the service ending request, the DLNA control unit 302 in the controller 12 has already acquired service information about the service to end, by performing the processing described above with reference to FIG. 4.

Then, the DLNA control unit 302 reads out the acquired service information. A part of or the entire service information acquisition processing can be performed in step S102.

In step S103 (determination processing), the service determination unit 301a determines the service type of the service to end based on the service information read out in step S102. More specifically, the service determination unit 301a in the controller 12 connected to the first network determines the type of the service existing in the first network.

If it is determined in step S103 that the service type of the service to end is the data receiving service (the digital television 11), then the processing advances to step S104 (second sending processing). In step S104, the service control unit 301b in the controller 12 sends a signal to the digital television 11 for ending the data request.

More specifically, if it is determined in step S103 that the service in the first network is the data receiving service (the digital television 11), then the service control unit 301b sends the service (the storage server 31) in the first network a signal for ending the data request for the service in the second network.

That is, in step S104, the service control unit 301b sends the signal for ending the data request to the service in the second network according to the protocol (DLNA) for controlling the service in the first network.

After receiving the signal for ending the data request, the digital television 11 performs the data request ending processing.

After completely performing the data request ending processing, the digital television 11 sends a completion notification to the controller 12.

The service control unit 301b in the controller 12 receives the completion notification in step S105 and confirms that the data request ending processing has been completed.

Then, in step S106 (first sending processing), the SIP control unit 303 sends the communication target network (the second network) a BYE request in the SIP (disconnection request).

More specifically, the SIP control unit 303 sends the second network a signal for requesting the disconnection of the logical connection between the first network and the second network. The controller 12 in the first network performs connection processing for establishing a session with the controller 32 in the second network.

Accordingly, the controller 12 in the first network, recognizes that the service, corresponding to the service of which the service ending request is detected in step S101, exists in the second network. Meanwhile, the controller 32 in the second network recognizes the service in the second network that sends data to the first network.

After receiving the BYE request sent to in step S106, the controller 32 sends a 200 OK response (the final reply) in response to the BYE request to the BYE request sending source controller 12.

Furthermore, after receiving the BYE request sent to in step S106, the controller 32 ends the data supply service by the service (the storage server 31) connected to the network in response to the received BYE request.

More specifically, in step S106, after sending the signal for ending the data request (step S104), the SIP control unit 303 sends the second network a signal for requesting to end the service in the connection target network (the second network). In step S106, the SIP control unit 303 sends a signal for requesting to end the service in the connection target network according to the protocol (SIP) for connecting the first and the second networks.

In step S107, after receiving the 200 OK response with the SIP control unit 303, the controller confirms that the SIP session has been disconnected. Then, the controller ends the service ending processing.

As described above, after detecting the service ending request, the controller determines the type of the service in the network to end. Then, after ending the data request by the data receiving service (the digital television 11) based on the result of determination, the controller ends the data supply service (the storage server 31).

By performing the above-described processing, the present exemplary embodiment can prevent the occurrence of a case where the data request is issued to a data supply service that is not operating.

On the other hand, if it is determined in step S103 that the type of the service is the data supply service (the storage server 31), then the processing advances to step S108. In step S108 (the first sending processing), the controller adds the signal for ending the data request to the BODY portion of the INFO request in the SIP and sends it to the communication target network.

If it is determined in step S103 that the service in the first network is the data supply service, then the SIP control unit 303 sends the signal for ending the data request to the data supply service in the first network to the second network.

In step S108, the controller sends the signal for ending the data request according to the protocol (SIP) for connecting the first and the second networks. Furthermore, the controller of the first network performs connection processing for establishing a session with the controller of the second network.

Thus, the controller in the first network recognizes that the service corresponding to the service ending request in step S101 exists in the second network. Meanwhile, the controller in the second network recognizes the service in the second network that receives data from the first network.

After receiving the INFO request sent to in step S108, the controller located on the communication target network analyzes the message in the request and sends a final reply to the INFO request sending source. Furthermore, the controller on the communication target network ends the data request by the data receiving service (the digital television 11) to end.

After receiving the notification that the processing for ending the data request has been completed from the digital television 11, the controller sends a BYE request in the SIP to the controller located in the source of sending the INFO request (step S108).

In step S109, the SIP control unit 303 in the controller receives the final reply in response to the INFO request (step S108). Then, in step S110, the SIP control unit 303 receives the BYE request in the SIP (disconnection request) from the communication target network (the second network).

After receiving the BYE request, the SIP control unit 303 in the controller sends a 200 OK response (the final reply) in response to the BYE request in step S111.

In step S112 (second sending processing), the service control unit 301b sends a signal for requesting to end the service of the data supply service (the storage server 31) in the data supply service (by the storage server 31) connected to the first network. This service is performed in response to the service ending request.

After sending the signal for ending the data request in step S108, the DLNA control unit 302 sends a signal for requesting to end the service in the first network.

In step S112, a signal for requesting to end the service according to the protocol (DLNA) for controlling the service in the first network is sent.

After receiving the signal for requesting to end the service, the storage server 31 performs processing for ending the data supply service. When the service ending processing is completed, the storage server 31 sends a completion notification indicating the completion of the service ending processing to the DLNA control unit 302 in the controller.

In step S113, the service control unit 301b in the controller receives the completion notification. Then, the service ending processing ends.

Next, processing for detecting that the service has been abnormally ended and the service ending processing performed in such a case are described.

A service may abnormally ends if the operation of the service providing apparatus (the digital television 11 and the storage server 31) has abnormally ended or if the connection for each network (home network) has been physically disconnected.

Figure 10:
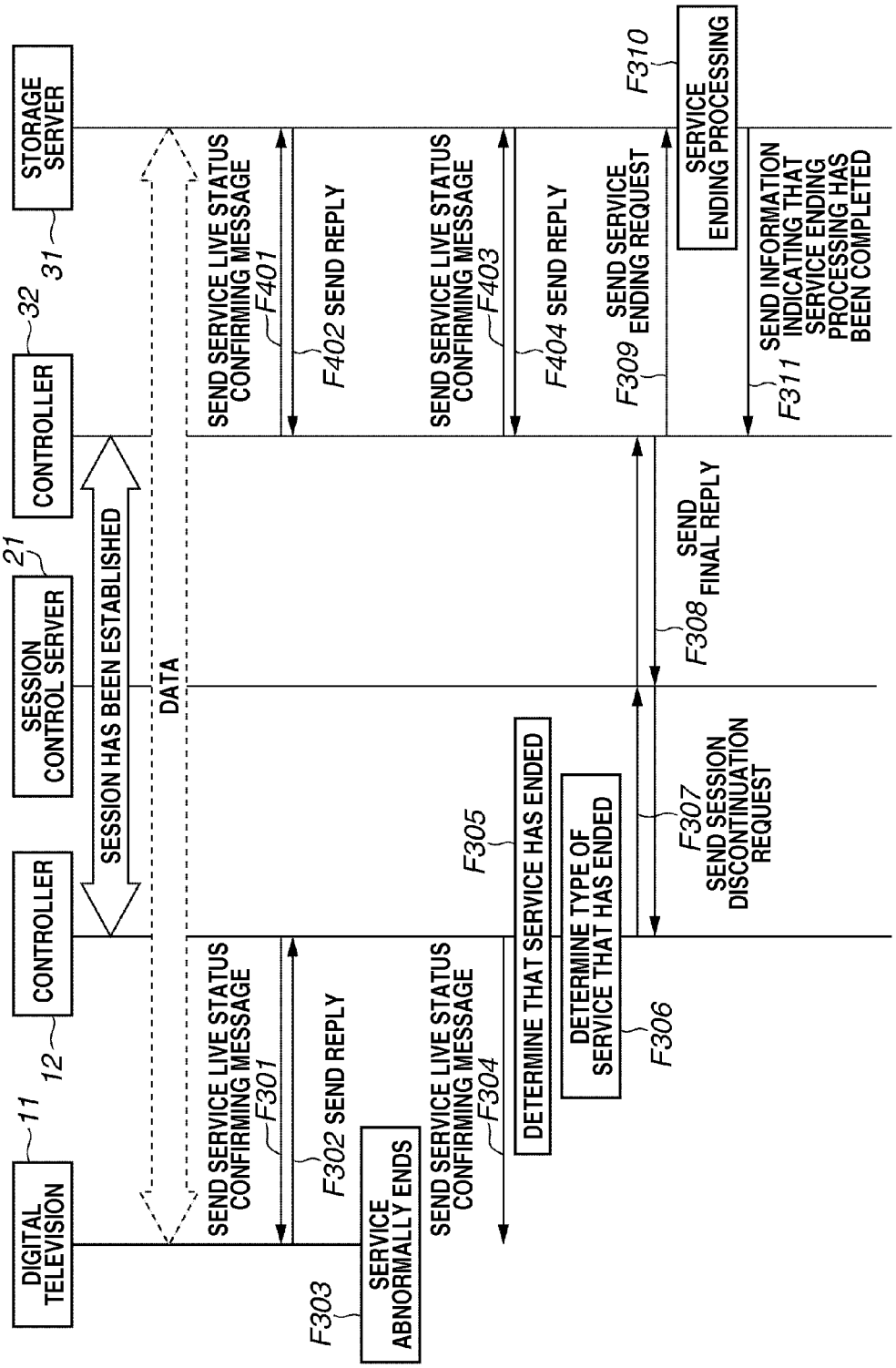
FIG. 10 illustrates an example of processing for ending a service when a service in the home network 1 has abnormally ended according to an exemplary embodiment of the present invention.

To begin with, processing is described with reference to FIG. 10 for ending the service in the communication target network (the second network) in the case where the abnormal ending is detected in the network (the first network), which is the home network 1 to which the digital television 11 is connected. In the example illustrated in FIG. 10, the service is performed between the service providing apparatuses, each of which is connected to the first network or the second network, until a service ending request is detected.

More specifically, the controllers have already established a session between the first and the second networks according to the user's instruction and have performed processing necessary for sending and receiving data between the digital television 11 and the storage server 31.

Accordingly, the controllers recognize which service providing apparatus connected to the first network sends and receives data with which service providing apparatus connected to the second network.

In the present exemplary embodiment, the DLNA is used as the protocol for controlling the service in the network (home network). The SIP is used as the protocol for connecting the home network 1 (the first network) with the home network 3 (the second network).

While an SIP session is established and alive, the service determination unit 301a in the controller sends a live status confirming message to the service providing apparatus in each network (the digital television 11 and the storage server 31) at a predetermined time interval (steps F301 and F401).

After receiving the live status confirming message, each of the digital television 11 and the storage server 31 sends a reply in response to the message to the service determination unit 301a of the controller (steps F302 and F402). More specifically, the service determination unit 301a in the controller 12 connected to the network (the home network 1) determines whether a reply in response to the live status confirming request to be sent to the apparatus connected to the home network 1 is present (has been received).

In step F303, the service provided by the digital television 11 abnormally ends. In step F304, after a predetermined time has elapsed after a last live status confirming message has been sent, the controller 12 sends another live status confirming message to the digital television 11.

However, because the digital television 11 abnormally ends, the controller 12 does not receive any reply in response to the live status confirming message.

If the controller 12 does not receive any message after a predetermined time has elapsed after sending the live status confirming message to the digital television 11, then, in step F305, the controller 12 determines that the service by the digital television 11 has abnormally ended.

If it is determined in step F305 that the service has ended, then in step F306, the service determination unit 301a in the controller 12 determines the type of the service in the home network 1 that has ended. In the present exemplary embodiment, the service in the home network 1 is the data receiving service.

In step F307, the SIP control unit 303 in the controller 12 sends a signal for ending the data supply service in the home network 3 to the home network 3. In step F307, the SIP control unit 303 sends the signal for ending the data supply service according to the protocol (SIP) for connecting the home network 1 with the home network 3.

Furthermore, in the present exemplary embodiment, the controller 12 sends an BYE request in the SIP (disconnection request), which is a signal for requesting the disconnection of the logical connection between the home network 1 and the home network 3 as the signal for ending the data supply service.

By performing the above-described processing, the present exemplary embodiment can issue a request for ending the service in a remote network and a session disconnection request at the same time with one signal. Different signals for the service ending request and the session disconnection request can also be used.

The controller in the first network (the home network 1) performs connection processing for establishing a session with the controller of the second network (the home network 3).

Accordingly, the controller in the first network recognizes that the service corresponding to the service determined to have ended in step F305 exists in the second network. Meanwhile, the controller of the second network recognizes the service in the second network that sends data to the first network.

After receiving the BYE request (disconnection request) from the controller 12, the SIP control unit 303 in the controller 32 sends a 200 OK response (the final reply) in response to the BYE request to the controller 12 in step F308.

Furthermore, in step F309, the service control unit 301b in the controller 32 sends a signal for requesting to end the service to the storage server 31.

After receiving the signal for requesting to end the service, the storage server 31 performs the service ending processing in step F310.

When the service ending processing is completed, the storage server 31 sends a completion notification indicating that the service ending processing has been completed to the service control unit 301b in the controller 32 in step F311.

As described above, the controller 12 performs the service ending processing in the following manner if it is determined that no reply in response to the live status confirming request has been sent from the apparatus connected to the home network 1 and that the service in the home network 1 is the data receiving service.

That is, the SIP control unit 303 in the controller 12 sends a signal for ending the data supply service (the storage server 31) in the home network 3 to the home network 3.

At this time, the SIP control unit 303 sends a signal for ending the data supply service according to the protocol (SIP) for connecting the home network 1 and the home network 3.

By performing the above-described processing, the present exemplary embodiment can prevent the occurrence of a case where data is supplied to a data receiving service (the digital television 11) that is not operating.

Furthermore, the present exemplary embodiment can end the service provided by the home network 3 and disconnect the session between the networks according to the ending of the service connected to the home network 1.

Next, processing is described with reference to FIG. 11 for ending the service in the communication target network (the second network) when the abnormal service ending is detected in the first network, the home network 3 to which the storage server 31 is connected.

A service is performed between the service providing apparatuses respectively connected to the first network and the second network until a service ending request is detected.

More specifically, the controllers have already established a session between the first and the second networks according to the user's instruction and have performed processing necessary for sending and receiving data between the digital television 11 and the storage server 31.

Accordingly, the controllers recognize which service providing apparatus connected to the first network sends and receives data with which service providing apparatus connected to the second network.

In the present exemplary embodiment, the DLNA is used as the protocol for controlling the service in the network (the home network). The SIP is used as the protocol for connecting the home network 1 (the first network) with the home network 3 (the second network).

While an SIP session is established and alive, the service determination unit 301a of the controller sends a live status confirming message (Keep Alive message) to the service providing apparatus in each network (the digital television 11 and the storage server 31) at a predetermined time interval (steps F501 and F601).

After receiving the live status confirming (Keep Alive) message, each of the digital television 11 and the storage server 31 sends a reply in response to the message to the service control unit 301b (step F502 and F602).

More specifically, the service control unit 301b in the controller 32 connected to the network (the home network 3) determines whether a reply to the live status confirming request to be sent to the apparatus connected to the home network 3 is present.

At the moment, the service by the storage server 31 abnormally ends in step F503.

In step F504, after a predetermined time period has elapsed after a last live status confirming message has been sent, the controller 32 sends another live status confirming message to the storage server 31.

However, because the storage server 31 abnormally ends, the controller 32 does not receive any reply in response to the live status confirming message.

If the controller 32 does not receive any message after a predetermined time has elapsed after sending the live status confirming message to the storage server 31, then, in step F505, the controller 32 determines that the service by the storage server 31 has abnormally ended. If it is determined in step F505 that the service has ended, then the service determination unit 301a in the controller 32 determines the type of the service in the home network 3 that has ended (step F506).

In the present exemplary embodiment, the service in the home network 3 is the data supply service. Accordingly, in step F507, the SIP control unit 303 in the controller 32 adds information, for requesting to end the data request sent from the home network 1, to an SIP BODY portion of the INFO request (information notification) and sends it to the home network 1. In step F603, controller 12 sends a live status confirming message to the digital television 11 in a similar way to the processing performed by the controller 32 in step F504. In step F604, since the digital television 11 has not abnormally ended, the controller 12 receives the reply from the digital television 11 in response to the live status confirming message. Therefore, the controller 32 does not perform the processing corresponding to the steps in step F505 and subsequent steps.

The controller in the first network (the home network 3) performs connection processing for establishing a session with the controller in the second network.

As described above, the controller in the first network recognizes that the service, corresponding to the service determined in step S505 to have ended, exists in the second network (the home network 1). Meanwhile, the controller in the second network recognizes the service in the second network that sends data to the first network.

After receiving the INFO request, the SIP control unit 303 in the controller 12 analyzes the BODY portion of the INFO request in step F508.

Then, the SIP control unit 303 in the controller 12 sends an 200 OK response in the SIP (the final reply) to the INFO request to the controller 32 in step F509.

In step F510, the service control unit 301*b* in the controller 12 sends a signal for ending the data request to the digital television 11.

After receiving the signal for ending the data request, the digital television 11 performs the data request ending processing to end the data request to the storage server 31 in step F511.

More specifically, in step F507, the SIP control unit 303 sends the signal for ending the data request according to the protocol (SIP) for connecting the home network 1 with the home network 3.

After completely performing the data request ending processing, the digital television 11 sends a completion notification indicating that the data request ending processing has been completed to the controller 12 in step F512.

After receiving the completion notification with the NETIF 204, the controller 12 sends an SIP BYE request (disconnection request), which is a signal for requesting the disconnection of the logical connection between the home network 1 and the home network 3, to the controller 32 in step F513.

After receiving the BYE request (disconnection request), the SIP control unit 303 in the controller 32 sends a 200 OK response (the final reply) in response to the BYE request to the controller 12 in step F514.

As described above, the controller 32 performs the service ending processing in the following manner if it is determined that no reply in response to the live status confirming request has been sent to the apparatus connected to the home network 3 and that the service in the home network 3 is the data supply service.

That is, the SIP control unit 303 in the controller 32 sends a signal, to the home network 1, for ending the data request from the data receiving service (the digital television 11) in the home network 1.

At this time, the SIP control unit 303 sends a signal for ending the data request according to the protocol (SIP) for connecting the home network 1 and the home network 3.

By performing the above-described processing, the present exemplary embodiment can prevent the occurrence of a case where data is supplied to a data supply service (the storage server 31) that is not operating.

Furthermore, the present exemplary embodiment can end the service provided by the home network 1 and disconnect the session between the networks according to the ending of the service connected to the home network 3.

Next, processing is described with reference to FIG. 12 for detecting an abnormal ending of a service performed by the service providing apparatus (the digital television 11 and the storage server 31) and processing for ending the service, which are performed by the controller.

The controller to be described below with reference to FIG. 12 is connected to the network where abnormal service ending (the first network) and ends the service in the communication target network (the second network) in response to the detection of the abnormal ending of the service.

A service is performed between the controllers respectively connected to each of the first network and the second network until a service ending request is detected via the session established and alive between the controllers.

More specifically, the controllers have already established a session between the first and the second networks according to the user's instruction and have performed processing necessary for sending and receiving data between the digital television 11 and the storage server 31.

Accordingly, the controllers recognize which service providing apparatus connected to the first network sends and receives data with which service providing apparatus connected to the second network.

Referring to FIG. 12, in step S201, the controller monitors elapsed time from the time at which the live status confirming message has been sent last and determines whether a predetermined time has elapsed. If the controller has not sent any live status confirming message yet, the controller monitors the time that has elapsed since the start of the service.

If it is determined in step S201 that the predetermined time has elapsed (YES in step S201), then the processing advances to step S202. In step S202, the service control unit 301*b* in the controller sends a live status confirming message to the service providing apparatus.

In step S203, the controller determines whether the service control unit 301*b* in the controller has received a response to the live status confirming message during the predetermined time period.

More specifically, the service control unit 301*b* in the controller determines whether any reply to the live status confirming request to be sent to the network (the home network) is present.

If it is determined in step S203 that no response to the live status confirming message has been received during the predetermined time interval (NO in step S203), then the controller determines that the service by the service providing apparatus has abnormally ended.

In step S204, the service determination unit 301*a* uses information about the service type acquired before the service starts to determine the type of the service that has ended.

If it is determined in step S204 that the type of the service that has ended is the data supply service (the storage server 31), then the processing advances to step S205.

In step S205, the controller sends a signal for ending the data request to the second network (the home network 1), which is the communication target network.

At this time, the controller sends a signal for ending the data request according to the protocol (SIP) for connecting the first network with the second network.

The controller in the first network performs connection processing for establishing a session with the controller in the second network.

As described above, the controller in the first network recognizes that the service corresponding to the service determined to have ended in step S204 exists in the second network. Meanwhile, the controller in the second network recognizes the service in the second network that sends data to the first network.

On the other hand, if it is determined in step S204 that the type of the service that has abnormally ended is the data receiving service (the digital television 11), then the processing advances to step S206.

In step S206, the controller sends a signal for requesting to end the service to the second network (the home network 3), which is a communication target network.

The controller sends a signal for requesting to end the service according to the protocol (SIP) for connecting the first network and the second network.

In addition, a BYE request in the SIP (disconnection request) for requesting the disconnection of the session can be used as the signal for requesting to end the service.

By using the BYE request, the present exemplary embodiment can issue a request for ending the service in a remote network and a session disconnection request at the same time with one signal. Different signals for the service ending request and the session disconnection request can also be used.

The controller in the first network performs connection processing for establishing a session with the controller of the second network.

Accordingly, the controller in the first network recognizes that the service corresponding to the service determined to have ended in step F305 exists in the second network. Meanwhile, the controller of the second network recognizes the service in the second network that sends data to the first network.

As described above, the controller performs the service ending processing in the following manner if it is determined that no reply, in response to the live status confirming request, has been sent to the apparatus connected to the network (the home network) and that the service in the network is the data receiving service.

That is, the SIP control unit 303 of the controller sends a signal for ending the data supply service (the storage server 31) in the second network to the second network.

At this time, the SIP control unit 303 in the controller sends a signal for ending the data supply service according to the protocol (SIP) for connecting the first and the second networks.

Furthermore, the controller performs the service ending processing in the following manner if it is determined that no reply, in response to the live status confirming request, has been sent to the apparatus connected to the network (the home network) and that the service in the network is the data supply service.

That is, the SIP control unit 303 in the controller sends a signal, to the second network, for ending the data request to the service in the first network.

At this time, the SIP control unit 303 of the controller sends a signal for ending the data request according to the protocol (SIP) for connecting the first and the second networks.

By performing the above-described processing, the present exemplary embodiment can prevent the occurrence of a case where the data request is sent to a data supply service (the storage server 31) that is not operating. Furthermore, according to the present exemplary embodiment, a case can be prevented from occurring where data is supplied to a data receiving service (the digital television 11) that is not operating.

Furthermore, the present exemplary embodiment can end the service in the home network 3 and disconnect the session held between the networks according to the end of the service connected to the home network 1.

Other Exemplary Embodiments

In the first exemplary embodiment, the service ending request by the user is input to the controller. However, the service ending request by the user can be input to the service providing apparatus (the digital television 11, the storage server 31).

Furthermore, it is also possible to use a command for powering off the apparatus or a command for shifting the apparatus to a standby mode as the signal for ending the data request (steps F104 and F207) to the data supply service (the storage server 31), as well as the command for ending the data request.

Furthermore, it is also possible to use a command for ending the data supply, a command for powering off the service providing apparatus, or a command for shifting the apparatus to a standby mode as the signal for ending the data supply service (steps F109 and F212).

Furthermore, in the first exemplary embodiment, a service ending request is detected (steps F101 and F201) when the user inputs a service ending request. However, the service ending request can be input at a predetermined timing. In this regard, for example, the timing set for ending a service can be set at the time when sending of the designated content ends or at the designated time (off timer).

The present invention can also be achieved by providing a system or an apparatus with a storage medium storing program code of software, which has the functions of the embodiments described above. Then, a computer (a CPU or a micro processing unit (MPU)) in the system or the apparatus reads out the program code and executes it.

In this case, the program code itself, which is read out from the storage medium, implements the functions of the embodiments described above, and accordingly, the storage medium storing the program code constitutes the present invention.

As the storage medium for supplying such program code, a floppy disk, a hard disk, an optical disk, a magneto-optical disk, a magneto-optic disk (MO), a CD-ROM, a compact disk recordable (CD-R), a compact disk rewritable (CD-RW), a magnetic tape, a nonvolatile memory card, a ROM, and a digital versatile disk (DVD (a DVD-recordable (DVD-R) or a DVD-rewritable (DVD-RW)), for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-296847 filed Nov. 15, 2007, which is hereby incorporated by reference herein in its entirety.

What is claimed is:

1. A communication apparatus for controlling a service, the communication apparatus comprising:
   a connection unit providing communication to a first network;
   a first sending unit configured to send to a second network a first signal, using a first protocol for connecting the first network with the second network, such that a data request is not sent from an apparatus in the second network to the service in the first network in a case where the service to be ended is a data supply service for supplying data from the first network to the apparatus in the second network according to the data request from the apparatus in the second network; and
   a second sending unit configured to send a second signal for ending the service in the first network using a second protocol for controlling the service in the first network after the first sending unit sends the first signal to the second network.

2. The communication apparatus according to claim 1, wherein the second sending unit sends the second signal in response to a request sent from the second network, using the first protocol, for disconnecting a logical connection between the first network and the second network.

3. The communication apparatus according to claim 1, wherein the second sending unit sends to the service in the first network a third signal using the second protocol such that the data request is not sent from the first network to a service in the second network in a case where the service to be ended in the first network is a data receiving service, and
wherein the first sending unit sends a fourth signal using the first protocol to the second network for ending the service in the second network after the second sending unit sends the third signal to the first network.

4. The communication apparatus according to claim 3, wherein the fourth signal sent by the first sending unit is a signal for requesting a disconnection of the logical connection between the first network and the second network.

5. The communication apparatus according to claim 1, wherein the second sending unit sends a confirming signal for confirming a live status of an apparatus that provides the service in the first network using the second protocol, and
wherein the first sending unit sends the first signal to the second network in a case where the service provided by the apparatus which has not transmitted a response for the confirming signal is the data supply service.

6. The communication apparatus according to claim 1, wherein the second sending unit sends a confirming signal for confirming a live status of an apparatus that provides the service in the first network using the second protocol, and
wherein the first sending unit sends a signal to the second network for requesting a disconnection of a logical connection between the first network and the second network using the first protocol in a case where the service provided by the apparatus which has not transmitted a response for the confirming signal is a data receiving service.

7. A method for controlling a communication apparatus connected to a first network, the method comprising:
sending a first signal using a first protocol for connecting the first network with a second network, from the communication apparatus to the second network, such that a data request is not sent from a second apparatus in the second network to the service in the first network in a case where the service to be ended is a data supply service for supplying data from the first network to the second apparatus in the second network according to the data request from the second network; and
sending a second signal from the communication apparatus for ending the service in the first network using a second protocol for controlling the service in the first network after sending the first signal to the second network.

8. The method according to claim 7, wherein the second signal for ending the service in the first network is sent in response to a request sent from the second network using the first protocol for disconnecting a logical connection between the first network and the second network.

9. The method according to claim 7, further comprising:
sending a third signal using the second protocol to the service in the first network such that the data request is not sent from the first network to a service in the second network in a case where the service to be ended in the first network is a data receiving service; and
sending a fourth signal using the first protocol to the second network for ending the service in the second network after sending the third signal to the first network.

10. The method according to claim 9, wherein the fourth signal is a signal for requesting disconnection of a logical connection between the first network and the second network.

11. The method according to claim 7, further comprising:
sending a confirming signal for confirming a live status of an apparatus that provides the service in the first network using the second protocol; and
sending the first signal to the second network in a case where the service provided by the apparatus which has not transmitted a response for the confirming signal is the data supply service.

12. The method according to claim 7, further comprising:
sending a confirming signal for confirming a live status of an apparatus that provides the service in the first network using the second protocol; and
sending a signal to the second network for requesting a disconnection of a logical connection between the first network and the second network using the first protocol in a case where the service provided by the apparatus which has not transmitted a response for the confirming signal is a data receiving service.

13. A non-transitory computer-readable storage medium storing instructions for a computer connected to a first network, the operations performed by the computer comprising:
sending a first signal using a first protocol for connecting the first network with a second network, from the computer to the second network, such that a data request is not sent from an apparatus in the second network to the service in the first network in a case where the service to be ended is a data supply service for supplying data from the first network to the apparatus in the second network according to the data request from the second network; and
sending a second signal from the communication apparatus for ending the service in the first network using a second protocol for controlling the service in the first network after sending the first signal to the second network.

14. The non-transitory storage medium according to claim 13, wherein the second signal is sent in response to a request sent from the second network using the first protocol for disconnecting a logical connection between the first network and the second network.

15. The non-transitory storage medium according to claim 13, wherein the operations further include:
sending a third signal using the second protocol to the service in the first network such that the data request is not sent from the first network to a service in the second network, in a case where the service to be ended in the first network is a data receiving service; and
sending a fourth signal using the first protocol to the second network for ending the service in the second network after sending the third signal to the first network.

16. The non-transitory storage medium according to claim 15, wherein the fourth signal is a signal for requesting disconnection of a logical connection between the first network and the second network.

17. The non-transitory storage medium according to claim 13, wherein the operations further include:
sending a confirming signal for confirming a live status of an apparatus that provides the service in the first network using the second protocol; and sending the first signal to the second network in a case where the service provided by the apparatus which has not transmitted a response for the confirming signal is the data supply service.

18. The non-transitory storage medium according to claim 13, wherein the operations further include:
sending a confirming signal for confirming a live status of an apparatus that provides the service in the first network using the second protocol; and sending a signal to the second network for requesting a disconnection of a logical connection between the first network and the second network using the first protocol in a case where the service provided by the apparatus which has not transmitted a response for the confirming signal is a data receiving service.

* * * * *